US008202164B2

(12) United States Patent
Lechner et al.

(10) Patent No.: US 8,202,164 B2
(45) Date of Patent: Jun. 19, 2012

(54) TICKET MANAGEMENT APPARATUS, A TICKETING DEVICE AND A DATA MANAGEMENT SYSTEM FOR CASHLESS OPERATION

(75) Inventors: Franz Lechner, Graz (AT); Helmut Steffenini, Stattegg (AT)

(73) Assignee: DR Gaming Technology, Knokke (BE)

( * ) Notice: Subject to any disclaimer, the term of this patent is extended or adjusted under 35 U.S.C. 154(b) by 1627 days.

(21) Appl. No.: 11/038,499

(22) Filed: Jan. 21, 2005

(65) Prior Publication Data

US 2006/0166732 A1 Jul. 27, 2006

(51) Int. Cl.

*G06F 17/00* (2006.01)
*G06F 19/00* (2006.01)
*A63F 9/24* (2006.01)
*A63F 13/00* (2006.01)

(52) U.S. Cl. ................. 463/42; 463/16; 463/25; 463/40

(58) Field of Classification Search ............. 463/16-20, 463/24, 25, 29, 40-42

See application file for complete search history.

(56) References Cited

U.S. PATENT DOCUMENTS

| | | | | |
|---|---|---|---|---|
| 5,265,874 | A | 11/1993 | Dickinson et al. | |
| 5,470,079 | A | 11/1995 | LeStrange et al. | |
| 6,012,832 | A | 1/2000 | Saunders et al. | |
| 6,048,269 | A * | 4/2000 | Burns et al. | 463/25 |
| 6,253,119 | B1 | 6/2001 | Dabrowski | |
| 6,280,326 | B1 | 8/2001 | Saunders | |
| 6,293,867 | B1 | 9/2001 | Heidel et al. | |
| 6,394,907 | B1 * | 5/2002 | Rowe | 463/42 |
| 6,498,655 | B1 * | 12/2002 | Brooks et al. | 358/1.12 |
| 6,623,357 | B2 | 9/2003 | Chowdhury | |
| 6,652,380 | B1 * | 11/2003 | Luciano | 463/25 |
| 6,675,152 | B1 | 1/2004 | Prasad et al. | |
| 6,676,515 | B1 * | 1/2004 | Baltz et al. | 463/25 |
| 6,679,775 | B1 * | 1/2004 | Luciano et al. | 463/25 |
| 6,763,998 | B1 | 7/2004 | Miodunski et al. | |
| 6,852,029 | B2 * | 2/2005 | Baltz et al. | 463/25 |
| 6,852,031 | B1 * | 2/2005 | Rowe | 463/29 |
| 6,916,244 | B2 * | 7/2005 | Gatto et al. | 463/25 |
| 7,099,035 | B2 * | 8/2006 | Brooks et al. | 358/1.15 |
| 7,324,973 | B2 * | 1/2008 | Taylor, III | 705/50 |

(Continued)

FOREIGN PATENT DOCUMENTS

FR 2752074 2/1998

(Continued)

OTHER PUBLICATIONS

"EPO Application No. 06 700 454.9 Examination Report", Apr. 15, 2008 , 8 pages.

(Continued)

*Primary Examiner* — Milap Shah
(74) *Attorney, Agent, or Firm* — Workman Nydegger

(57) ABSTRACT

The present invention relates to a ticket management apparatus (TMA) for cashless operation of gaming machines (100*a*-100*n*), comprising a ticketing device (400*a*-400*n*) for inputting and outputting tickets (500) containing gaming data (502) and at least one data management device (101*a*-101*n*). The data management device (101*a*-101*n*) includes a gaming machine interface (GMIa-GMIn) for exchanging gaming data (502) with a controller (103*a*-103*n*) of a gaming machine (100*a*-100*n*), a ticketing device interface (TDIa-TDIn) for exchanging gaming data (502) with that ticketing device (400*a*-400*n*), a processor unit (106*a*-106*n*), a memory unit (107*a*-107*n*) and an external communication interface (ECIa-ECIn) for exchanging gaming data (502) with one or more devices (208) external to that ticket management apparatus (TMA).

26 Claims, 5 Drawing Sheets

U.S. PATENT DOCUMENTS

| | | | | |
|---|---|---|---|---|
| 7,494,414 | B2 * | 2/2009 | Hedrick et al. | 463/20 |
| 7,618,324 | B2 * | 11/2009 | Gatto et al. | 463/40 |
| 7,717,791 | B2 * | 5/2010 | Gatto et al. | 463/43 |
| 7,862,418 | B2 * | 1/2011 | Luciano et al. | 463/16 |
| 2002/0025850 | A1 * | 2/2002 | Hafezi | 463/29 |
| 2002/0151356 | A1 * | 10/2002 | Burns et al. | 463/25 |
| 2002/0169020 | A1 | 11/2002 | Saunders et al. | |
| 2003/0078094 | A1 * | 4/2003 | Gatto et al. | 463/25 |
| 2003/0171145 | A1 * | 9/2003 | Rowe | 463/25 |
| 2003/0186739 | A1 * | 10/2003 | Paulsen et al. | 463/25 |
| 2003/0228907 | A1 * | 12/2003 | Gatto et al. | 463/42 |
| 2004/0002379 | A1 | 1/2004 | Parrott et al. | |
| 2004/0043813 | A1 * | 3/2004 | Chamberlain et al. | 463/25 |
| 2004/0058728 | A1 * | 3/2004 | Fayter et al. | 463/25 |
| 2004/0095604 | A1 | 5/2004 | Meyerhofer | |
| 2004/0116185 | A1 * | 6/2004 | George et al. | 463/42 |
| 2004/0192442 | A1 * | 9/2004 | Wells et al. | 463/36 |
| 2005/0096126 | A1 * | 5/2005 | Prasad et al. | 463/25 |
| 2005/0164779 | A1 * | 7/2005 | Okuniewicz | 463/25 |
| 2005/0187013 | A1 * | 8/2005 | Gatto et al. | 463/25 |
| 2005/0215316 | A1 * | 9/2005 | Rowe et al. | 463/29 |
| 2005/0233802 | A1 * | 10/2005 | Gatto et al. | 463/25 |
| 2006/0172798 | A1 * | 8/2006 | Crowder et al. | 463/25 |

FOREIGN PATENT DOCUMENTS

| | | |
|---|---|---|
| WO | WO9508164 | 3/1995 |
| WO | WO03028826 | 4/2003 |
| WO | WO2006076750 | 7/2006 |

OTHER PUBLICATIONS

"PCT Application No. PCT/AT2006/000012 International Preliminary Report on Patentability", Jul. 24, 2007 , 8 pages.

"PCT Application No. PCT/AT2006/000012 International Search Report and Written Opinion", Feb. 27, 2006 , 13 pages.

* cited by examiner

--PRIOR ART--

TICKET MANAGEMENT APPARATUS, A TICKETING DEVICE AND A DATA MANAGEMENT SYSTEM FOR CASHLESS OPERATION

TECHNICAL FIELD OF THE INVENTION

The present invention relates to a ticket management apparatus, a ticketing device, a data management system for cashless operation of a system of gaming machines and a cashless gaming system. The invention specifically relates to casino game playing services for a gaming unit such as slot machines and video poker machines and in particular to systems and methods for dispensing and highly secure processing of cashless media such as paper tokens or bonus tickets from an electronic gaming unit.

The ticket management apparatus of the present invention comprises a ticketing device for inputting and outputting tickets containing the gaming data and at least one data management device including a gaming machine interface for exchanging gaming data with a controller of a gaming machine, a ticketing device interface for exchanging gaming data with the ticket device, a processor unit for processing gaming data, a memory unit for storing gaming data and an external communication interface for exchanging gaming data with one or more devices external to that ticket management apparatus.

DESCRIPTION OF RELATED ART

A typical gaming machine is preferably electronic in design and operation and has only a few or no electromechanical or mechanical parts for an operation. Such an electronic gaming machine may comprise an electronic paper token acceptor which is designed to accept designated tokens and reject others.

Preferably a server is connected to a data management system for controlling and monitoring all interconnected gaming machines operated in cash and cashless mode. Specific gaming machines are connected to the server which is designed to receive data from and send data to the individual electronic gaming machines.

In general electronic gaming machines are designed as slot machines, card playing tables, roulette tables, dice tables etc. An electronic gaming system which comprises a plurality of electronic gaming machines interconnected by means of a data bus device can be part of a casino management system.

The US 2004/002379 A1 discloses a scan based configuration control in a gaming environment. Automatic systems and methods are provided for configuring and reconfiguring gaming machines and games playable on a gaming machine. Specifically this document discloses a communication method to provide a communication from a ticket reader to a gaming machine controller. This ticket device, however, is not capable to be operated by a gaming system as the ticketing device can only be operated by the associated gaming machine.

U.S. Pat. No. 5,265,874 discloses a technology for cashless operation of a gaming machine. The operation is performed using a ticket reader and a ticket writer for plastic cards. The device disclosed in U.S. Pat. No. 5,265,874 includes a ticket reader and writer which is not capable to be operated by the gaming system. The ticket reader/writer can only be operated by the associated machine.

Further prior art in the field of ticketing systems is disclosed in U.S. Pat. No. 6,012,832 where a ticketing device is described which is controlled by a gaming machine and a central data management system. A corresponding ticketing device provides separate slots for insertion and dispensing of a ticket. It is a disadvantage of the device disclosed in U.S. Pat. No. 6,012,832 that the operation of the ticketing device is inconvenient because different slots have to be identified by the player of the gaming machine. Furthermore, the device disclosed in U.S. Pat. No. 6,012,832 is not capable for the use in a ticketing system controlled by a distributed data management system.

U.S. Pat. No. 6,293,867 describes a gaming machine payout system and a respective method. The payout is performed by dispensing paper tokens from a gaming machine. The system includes a hopper for dispensing the paper tokens, a cassette for containing the paper tokens, and software for controlling the operations of the payout of the paper tokens. U.S. Pat. No. 6,293,867 describes the mechanical set-up of a ticket dispenser located in and communicating with a gaming machine. The ticket dispenser does not comprise a ticket reader and does not provide a decentralized system for controlling and operating the ticketing device.

U.S. Pat. No. 6,763,998 describes a system and a method for securely storing and controlling the dispensing a payout from a gaming machine. Furthermore, interconnected ticket dispensers and a central storing of ticketing data are described. The system as shown in document U.S. Pat. No. 6,763,998 is not capable of handling ticketing devices operated by a data management system. Furthermore, a ticket reader is not operated by the device disclosed in U.S. Pat. No. 6,763,998.

A further prior art in the field of electronic gaming machines is disclosed in U.S. Pat. No. 6,675,152 where a transaction signature is described, providing a protection for transaction information stored in a database of a gaming network. The transaction signature is generated each time the user completes a transaction at an electronic gaming machine. The signature is generated using transaction information from a particular transaction. It is a disadvantage, that the described method is operated using a central database and that it is not applicable for a ticketing system operated and controlled by a distributed data management system.

U.S. Pat. No. 6,623,357 discloses a paper token and a complementary coupon dispenser. An electronic gaming machine is described which allows a user to play a gambling game, wherein at least one of a plurality of types of value to the user based on user preference information at the conclusion of the gambling game is dispensed.

U.S. Pat. No. 6,623,357 only describes the background technology for operating a ticketing system including a ticket reader and a ticket dispenser. It is a disadvantage, however, that the device described in U.S. Pat. No. 6,623,357 is operated using different slots for dispensing and reading tickets. Furthermore, a direct communication from a decentralized data management system with the ticketing devices in order to control the ticketing system cannot be provided.

U.S. Pat. No. 5,470,079 describes a gaming machine accounting and monitoring system. The system is used in casino operation at the link with interconnected electronic gaming machines. The process of accounting includes data from handling cashless media such as paper tickets inserted to and read by a ticket reader.

It is a disadvantage that the device disclosed in U.S. Pat. No. 5,470,079 does not provide distributed data management devices capable to directly communicate with a ticketing device and an electronic gaming machine. The document only describes an operation with a central database.

Another ticketing system which uses a cashless peripheral device for an electronic gaming system is described in US 2002/0169020. A centralized casino management system is disclosed which is operated by a central controller capable to control and operate the ticketing device of the electronic gaming machine.

The ticketing device is mounted at the electronic gaming machine. The device described in US 2002/0169020, however, does not provide a ticketing device with a common slot for dispensing and inserting a ticket. Furthermore, it is a disadvantage that the ticketing system does not provide a decentralized data management system operated by a communication of decentralized data management devices with the ticketing devices.

FIG. 1 schematically illustrates the conventional ticket management apparatus for cashless operation of electronic gaming machines. The electronic gaming machines are interconnected by a network 805 where a database 806 is provided for storing gaming data. Furthermore, a server 807 is connected to the network 805 for controlling electronic gaming machines 800*a*, 800*b*, . . . connected to the network 805. The electronic gaming machines 800*a*, 800*b* are of a similar design such that only the electronic gaming machine 800*a* is described in the following.

Essentially the electronic gaming machine 800*a* comprises a cash-out button 804 to initiate a cash-out operation by the user (player) of the gaming machine 800*a*. Furthermore, a display unit 804*a* is provided to display gaming data relevant for the user of the gaming machine 800*a* such as credits played.

The gaming machine 800*a* includes a controller 801*a* in order to electronically control the operation of the gaming machine. If the gaming machine does support cashless operation a player can insert a ticket into a ticket acceptor 803*a* which is located at the front side of the electronic gaming machine 800*a*. In order to get the cashless media from the electronic gaming machine 800*a*, the player must receive a ticket from a ticket dispenser 802 which is provided separately from the ticket acceptor 803.

It is a disadvantage of the conventional electronic gaming machine 800*a* that tickets to be inserted into the gaming machine 800*a* and tickets to be received from the electronic gaming machine are guided through different slots, i.e. the ticket acceptor 803 separate from the ticket dispenser 802. Furthermore, it is a disadvantage of conventional electronic gaming machines that an operation of the ticketing separated from a gaming machine cannot be provided. The ticketing device is not capable for a data exchange via a network 805 connected to the electronic gaming machine 800*a*, 800*b*.

A conventional ticketing device comprising the ticket dispenser 802*a*, 802*b* and the ticket acceptor 803*a*, 803*b* is capable only to communicate with the associated electronic gaming machine, i.e. the electronic gaming machine 800*a* and 800*b*, respectively. Conventional electronic gaming machines are of various types such as slot machines, video poker machines, video keno machines, video blackjack machines and the like.

In general casinos or other entertainment facilities include numerous electronic gaming machines of various types to satisfy the varying preferences of players. For example, a casino may include a variety of electronic gaming machines that may be linked to one another via a network. In a typical electronic gaming machine of a casino a player (user) inserts currency such as coin tokens, coins and scrip or paper denominations into a respective electronic gaming machine to activate play.

In addition a player may insert a gaming card into the gaming machine and designate the number of credits to be played. If the particular play results in a winning combination the gaming machine dispenses the appropriate payout for that particular combination. In such an event the win is frequently dispensed from the respective electronic gaming machine in the form of coin tokens or coins which are stored in the coin hopper of the respective electronic gaming machine. Thus it is a disadvantage that it is necessary to refill the hopper. Disadvantageously the time the machine is off-line results in no play on the electronic gaming machine and consequently in a loss of income for the casino.

Furthermore, the provision of bill acceptors for electronic gaming machines results in the possibility of the hopper running low or empty. In this case players (users) insert paper denominations or scrip into the machine and are still paid out via coin tokens or coins.

In this regard, when the player inserts paper currency into the machine, the coin tokens paid out from the hopper are not replenished. Disadvantageously this results in the need for additional fills into the respective electronic gaming machine more often than before the inclusion of bill acceptors. In turn this results in higher operating costs for the casinos and in a player dissatisfaction, when the machine fails to pay off and/or when it is taken off-line.

Thus, electronic gaming machines have been devised for dispensing a payout in the form of tickets or paper tokens such as paper money, paper scrip, vouchers or gift certificates. These provide advantages over coin tokens in convenience, security, reliability and entertainment value for casinos and players of the electronic gaming machines. For secure data handling and associated procedures it is important that especially in a cashless operation preferably a data management system is connected to the electronic gaming machines included in an electronic gaming system.

A device is provided to control and monitor specific electronic gaming machines connected to a controller and to receive data from the electronic gaming machines. Thus, it is advantageous if problems arise associated with dispensing paper tokens. Moreover, security is a major issue in the electronic gaming industry.

It is important to provide systems in gaming machines to ensure the integrity of the dispenser and the tickets to be dispensed therefrom. Type accounting inspection and internal operating procedures for tracking and reporting on the flow of money are additional essential topics for casino operators. Furthermore, money in and out of each gaming machine must be tracked to measure and ensure a proper operation of the respective gaming machine. Accordingly such accounting requirements must be taken into account in electronic gaming systems dispensing paper tokens.

An important security and accounting concern for casinos is the ability to track and monitor the amount of money and/or the quantity of tickets in and out of the ticket dispensers. The data generated in the electronic gaming machine are required for reconciliation of security and accounting data needs to be readily and reliably available from the electronic gaming machine connected to the electronic gaming system. Credit means such as cash-out vouchers find wide use.

In order to check monitor activities of electronic gaming machines which are dealing with paper tokens or tickets, many devices have been proposed by electronically linking a number of gaming machines in an electronic gaming system by the use of networks. It is necessary that most of the data be collected, stored, processed and explored. This is why data have to be communicated from the location where they are generated to the location where they can be processed.

Furthermore, data have to be provided for an operator of the electronic gaming system, preferably at the location of a separate operator terminal. Such data management and communication devices require reliable data management systems. Ticketing systems except for plastic card systems have in common that the player has to insert the ticket or voucher at a different unit where it is printed. This is a major disadvantage of current ticketing or voucher systems as it is more convenient for the player if the player only has to deal with one single port (one single slot) for all ticket transactions.

Another disadvantage of currently used electronic gaming systems is that a ticket printing device and a ticket reading device can only communicate with and be controlled by the controller of the respective electronic gaming machine. Thus the ticketing system is dependent on the respective electronic gaming machine. Disadvantageously an independent usage of a ticketing system is not possible using conventional electronic gaming devices and electronic gaming systems.

All the information for the network is preferably stored in a database for consistent access by the electronic gaming machines connected to the network of electronic gaming devices. Furthermore, casino personnel can access such kind of databases. Data stored in these databases may be processed in a central unit or may be used as it is, in a decentralized manner.

SUMMARY OF THE INVENTION

It is thus an object of the present invention to provide a ticket management apparatus for the operation of gaming machines, a ticketing device for inputting and outputting tickets containing gaming data, a data management system for the operation of a system of gaming machines which allow a cashless operation wherein the ticketing device for inputting and outputting tickets containing gaming data can be operated independently from one or more electronic gaming machines operated in a network of an electronic gaming system.

The object is achieved by a ticket management apparatus for cashless operation of electronic gaming machines.

Furthermore, the object is achieved by a ticketing device inputting and outputting tickets containing gaming data.

Moreover, the above object is achieved by a data management system for cashless operation of a system of electronic gaming machines.

Furthermore, the object is achieved by a cashless gaming system comprising a plurality of electronic gaming machines.

One aspect of the invention is to provide a ticket management apparatus for cashless operation of electronic gaming machines. The apparatus comprises a ticketing device for inputting and outputting tickets containing gaming data and at least one data management device for exchanging gaming data. The data is communicated to a controller of the gaming machine, to the ticketing device and to one or more devices external to that ticket management apparatus.

Therefore it is also possible to provide data communication with external ticketing devices within gaming machines connected to the gaming network. A connection to the gaming network may be provided by a local area network or by a wide area network. The ticketing device for inputting and outputting tickets is characterized by a reading unit and a writing unit. The reading unit is designed for reading off gaming data from a ticket which has been inserted. The writing unit is for writing gaming data onto a ticket which has been transported from a ticket storage to the writing unit. The reading unit and the writing unit share a common housing having a single common slot for inserting and outputting tickets which contain the gaming data.

A data management system of the invention for the cashless operation of interconnected gaming machines comprises a data bus device and at least two ticket management apparatus. Each of them is associated with a respective gaming machine and each has the respective external communication interface thereof connected to the data bus device. The data bus device exchanges gaming data among the ticket management apparatus.

According to a further aspect of the present invention a cashless gaming system comprises a plurality of gaming machines, a plurality of ticket management apparatus each associated with a respective gaming machine and a data bus device. The respective external communication interfaces of the plurality of ticket management apparatus are connected to the data bus device for exchanging gaming data between at least the gaming management apparatus.

It is thus an advantage of the present invention that the ticket management apparatus provides an independent use of a ticketing device such that the ticketing device can exchange gaming data not only with the associated electronic gaming machine but with other devices external to the electronic gaming machine and external to the ticket management apparatus.

Specifically, the ticket management apparatus for cashless operation of electronic gaming machines includes at least one data management device which comprises:

- a gaming machine interface for exchanging gaming data with a controller of a gaming machine, wherein the gaming data comprise read data which are read from a ticket and write data written onto a ticket;
- a ticketing device interface for exchanging gaming data with the ticketing device;
- a processor unit for processing gaming data;
- a memory unit for storing data; and
- an external communication interface for exchanging gaming data with one or more devices external to that ticket management apparatus.

It is thus an advantage of the present invention that an improved system for dispensing, containing, tracking and monitoring paper tokens used in electronic gaming machines can be provided in a decentralized manner. Furthermore, the present invention provides a new and improved system for printing tickets controlled and securely monitoring by a data management system. A further advantage of the present invention is the controlled dispensing of a payout such that security is increased and the need for refilling gaming machines with coin tokens or coins is reduced or eliminated. This innovative ticketing system is independent of a specific electronic gaming machine and easy to use.

Thus, a specific advantage of the present invention is that the ticket management apparatus includes a ticketing device for printing and reading a ticket and a system for securely storing and controlling the dispensing of a payout and the acceptance of a ticket at a local station. The system may provide a ticketing device including a payout dispenser for. The ticketing device may advantageously include a ticket reader to accept cashless values for the player. The ticketing device may further have a communication device in order to communicate all the relevant data to the network system. Specifically the data, especially gaming data, are communicated to a decentralized or centralized casino management system.

It is preferred that the system further includes an operator terminal for controlling and monitoring the cashless operation, adapted to be connected to the network of gaming machines or the network of ticket management apparatus. The system may also include an interface for interconnecting the ticket management apparatus and the respective electronic gaming machine.

The data management device within the ticket management apparatus comprises an input unit for inputting control data from the system and an output unit for outputting the relevant gaming and ticket transfer data to external devices.

According to another aspect of the present invention the ticket management apparatus comprises a reading unit and a writing unit. The purpose of the reading unit is to read gaming data from a ticket which has been inserted and the purpose of the writing unit is to write gaming data onto a ticket which has been transported from the ticket storage to the writing unit.

According to yet another aspect of the present invention the reading unit and the writing unit share a common housing having a single common slot for inserting and outputting tickets. Thus, it is convenient for the user of the electronic gaming machine that there is no need to differentiate between output slots and input slots.

According to yet another aspect of the present invention the read data read from the ticket is money data. Furthermore, it is possible, that the write data written onto the ticket is money data. Preferably the write data comprises one or more selected from the group consisting of time data, position data, ticket identification data, amount of credit data, number of credits data, time stamp data, player's name data, player tracking data, bonusing data and casino data.

Preferably the ticket includes one selected from the group consisting of a paper token, a voucher and a bonus ticket.

According to yet another aspect of the present invention a ticket media of the ticket includes one selected from the group consisting of a paper ticket, a chip card, an inductive contact-free card, a non-volatile memory card, a magnetic stripe card and a punch card.

According to yet another aspect of the present invention the writing unit comprises an encryption unit for encrypting the game data before writing then onto that ticket. Furthermore that reading unit comprises decryption unit for decrypting the gaming data read from the ticket.

Preferably the processed gaming data comprises one or more selected from the group consisting of audit data, cash-out data, jackpot data, cash-flow data, number of games data, identification data, position-related data, site data, system-related data, valuta data, player data, loyalty point data and bonusing system data.

The processed gaming data comprises one or more selected from the group consisting of static data and dynamic data of electronic gaming machines.

Herein static data includes one or more selected of the group consisting of position-related data, parameters of the gaming machine, denomination data, maximum bet data, payout percentage data, serial numbers, game identification data, paytable identification data, bill country data, validation data and game number data.

Herein the dynamic data includes one or more selected from the group consisting of site configuration data, jackpot configuration data and audit data.

The electronic gaming machine with which the data management device exchanges gaming data is selected from the group consisting of a slot machine, any device featuring games, a video poker, an electronic roulette, an electronic blackjack, an electronic bingo, a gaming table, a card playing table, a roulette table or a dice table.

According to yet another aspect the present invention comprises a ticketing device wherein the reading unit comprises a barcode reader. Furthermore, the reading unit can comprise a magnetic stripe reader.

Furthermore, it is preferred that the reading unit may comprise a sensor unit selected from one or more of the group consisting of a UV-sensor, a photo-transistor, an infrared LED, a green LED, a transparency sensor and an inductive sensor.

According to yet another aspect of the present invention the ticketing device comprises a writing unit which includes a printer unit.

Furthermore, it is preferred that the ticket is one selected from the group consisting of a bar-coded paper token, a magnetic stripe, a voucher, a smart card, a punch card and cage card.

According to yet another aspect of the present invention the ticketing device comprises at least one first container for storing and dispensing ticket payout and at least one second container for accepting and storing tickets inserted into the single common slot.

According to yet another aspect of the present invention the data management system comprises an operator terminal connected to the data bus device for monitoring one or more of the gaming machines through that ticket management apparatus. Furthermore, it is preferred that a central storage may be provided which is connected to the data bus device.

According to yet another aspect of the present invention the cashless gaming system further comprises an operator terminal for monitoring one or more of the gaming machines through that ticket management apparatus.

Furthermore a central storage may be connected to the data bus device.

According to yet another aspect of the present invention the cashless gaming system further comprises a cash dispenser connected to the data bus device in order to redeem the ticket. Moreover, it is preferred that the cashless gaming system further comprises a cage connected to the data bus device in order to redeem the ticket.

BRIEF DESCRIPTION OF THE DRAWINGS

Embodiments of the present invention are depicted in the drawings and are explained in more detail in the following description.

In the drawings.

Same reference numerals refer to same or similar elements in the drawings.

BEST MODE FOR CARRYING OUT THE INVENTION

The present invention will now be described more fully hereinafter with reference to the accompanying drawings, in which preferred embodiments and examples of the invention are shown.

Figure 1:
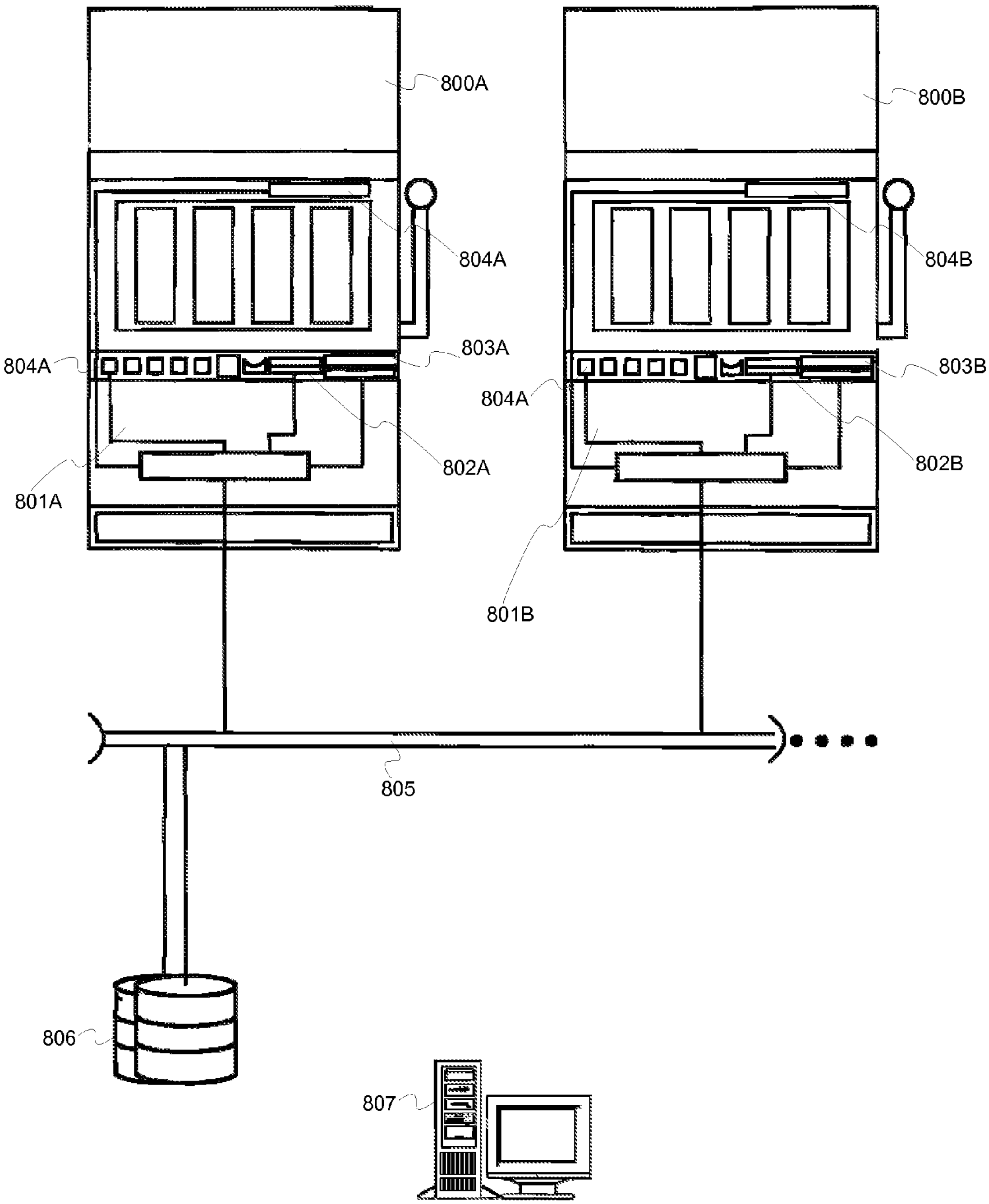
FIG. 1 is a schematic diagram of a gaming system consisting of interconnected gaming machines in a network according to prior art.
Figure 2:
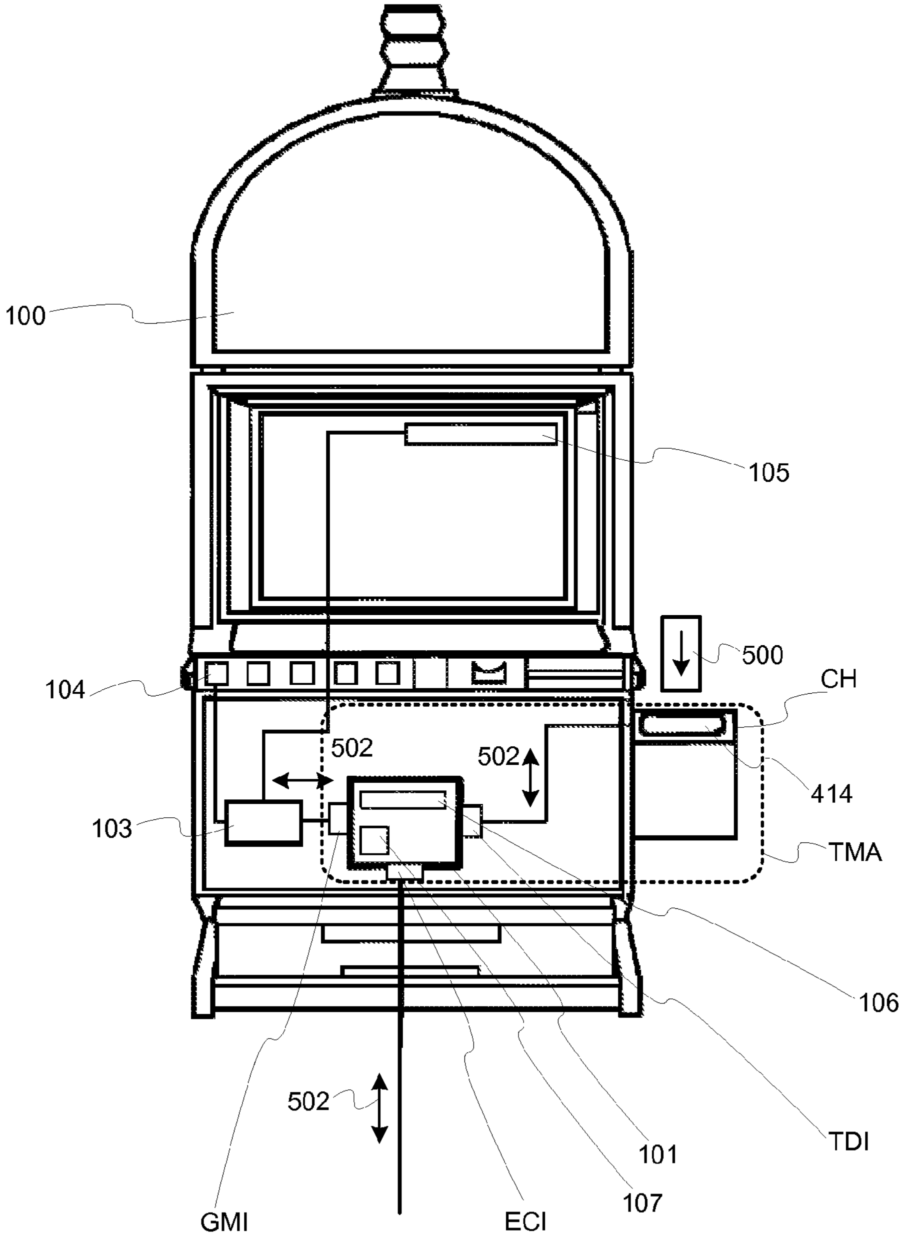
FIG. 2 is an electronic gaming machine with a ticketing device according to a preferred embodiment of the present invention.

FIG. 2 exhibits a ticket management apparatus TMA for cashless operation of gaming machines 100 according to a preferred embodiment of the present invention, comprising a ticketing device 400 for inputting and outputting tickets containing gaming data and at least one data management device 101.

The data management device 101 has a gaming machine interface GMI for exchanging gaming data with a controller 103 of the gaming machine 100, a ticketing device interface TDI for exchanging gaming data with the ticketing device 400, a processor unit 106 for processing gaming data, a memory unit 107 for storing gaming data and an external communication interface ECI for exchanging gaming data with one or more devices external to the ticket management apparatus TMA.

The electronic gaming machine 100 shown in FIG. 2 essentially consists of means for performing a game such as cash-out buttons 104 and display units 105.

The central unit of the inventive electronic gaming machine 100 is the data management device 101 which is located centrally in the data flow of the electronic gaming machine 100. The data management device 101 of the gaming machine 100 includes a gaming machine interface GMI for exchanging gaming data with a controller 102 provided in the gaming machine 100. Furthermore the data management device 101 includes the ticketing device interface TDI which is designed for exchanging gaming data with a ticketing device. The ticketing device 400 and the data management device 101 form the ticket management apparatus TMA.

Using the ticket management apparatus TMA a cashless operation of the electronic gaming machine 100 is facilitated. It is thus possible to exchange gaming data from an external unit (not shown) with the ticketing device 400. Furthermore the data management device 101 of the electronic gaming machine includes the processor unit 106 for processing the gaming data 503, the memory unit 107 for storing the gaming data 502 and the external communication interface ECI for exchanging gaming data with one or more devices external to that ticket management apparatus TMA. Thus it is possible to communicate gaming data with at least one other data management device 101*b* . . . 101*n* of another electronic gaming machine 100*b* . . . 100 *n*.

It is noted that the gaming machines of the preferred embodiment of the present invention are similar to each other such that only one electronic gaming machine 101*a* is described. The reference numerals followed by letters a, b, . . . , n refer to the respective electronic gaming machines 100*a*, . . . , 100*n*.

Figure 4:
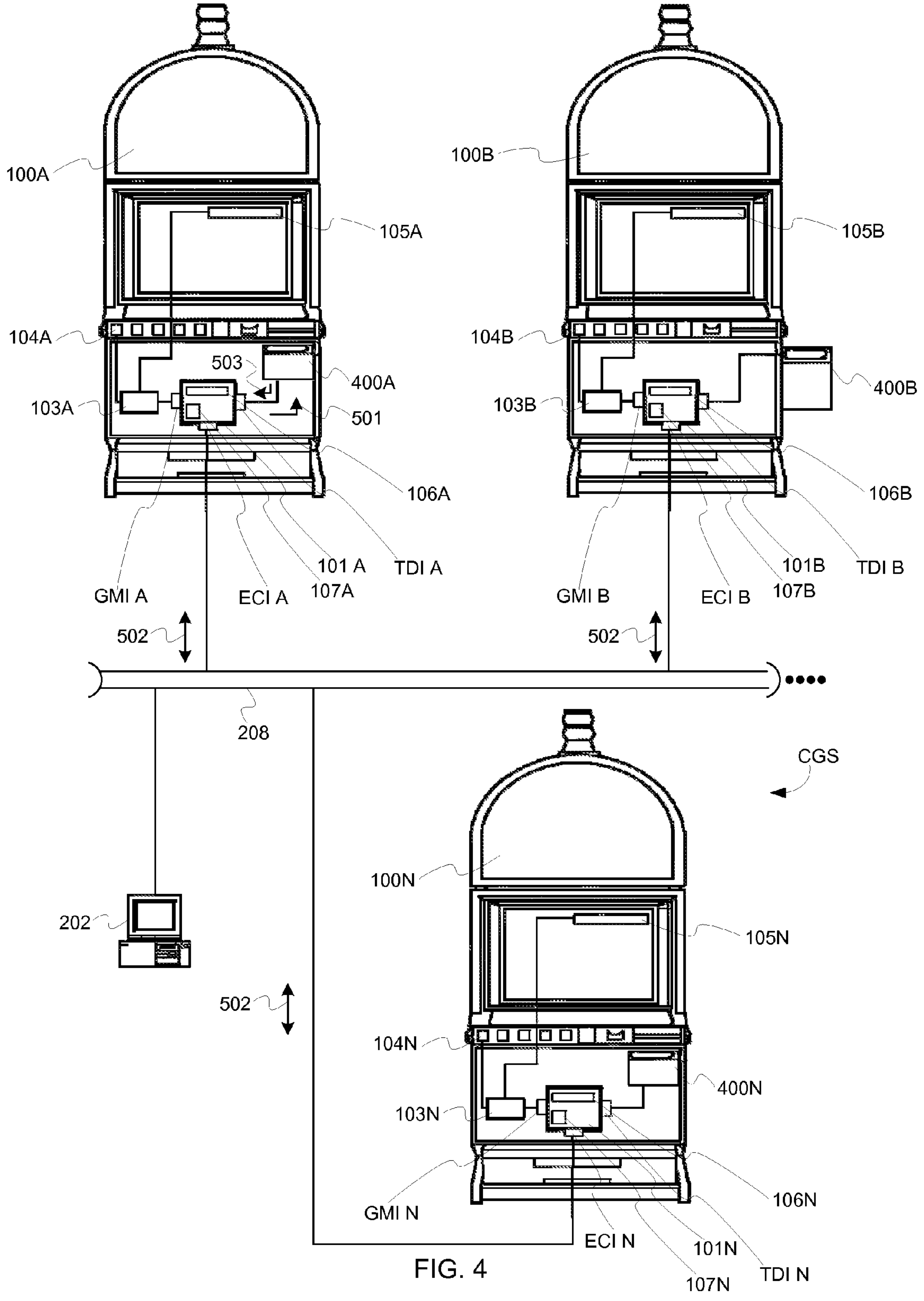
FIG. 4 is a cashless electronic gaming system consisting of three electronic gaming machines and an operator unit connected by a data bus device.

FIG. 4 illustrates a data management system for cashless operation of a number of gaming machines 100*a*-100*n* according to a preferred embodiment of the present invention. The data management system comprises a data bus device 208 and at least two ticket management apparatus TMA each associated with a respective gaming machine 100*a*-100*n*. Each of the ticket management apparatus TMA has the respective external communication interface ECIa-ECIn thereof connected to the data bus device 208. The data bus device 208 exchanges gaming 502 data among the ticket management apparatus.

As shown as an example in FIG. 4, three electronic gaming machines 100*a*, 100*b*, . . . , 100*n* are connected to the data bus device 208 as a device external to the ticket management apparatus TMA. Thus it is possible to transfer gaming data 502 from one gaming machine to another gaming machine 100*a*, . . . , 100*n*.

As shown in FIG. 4 an operator terminal 202 is connected to the data bus device 208 in order to control the operation of the electronic gaming machines 100*a*-100*n*. Thus it is an advantage that gaming data 502 of any gaming machine 100*a*-100*n* and of any ticketing device 400*a*-400*n* mounted at a respective gaming machine 100*a*-100*n* can be stored in a memory unit 107*a*-107*n* of a data management device 101*a*-101*n* by means of the respective processor unit 106*a*-106*n*.

Thus, it is an advantage that a data management system is provided which is simplified as gaming data 502 are stored on each of the data management devices 101*a*-101*n*. In conventional electronic gaming systems, data are only stored in a central data base.

Advantageously, the gaming data comprise one or more of audit data, door opening data, pay out data, jackpot pay out data, cash flow data, number of games data, identification data, position related data, jackpot configuration data, site configuration data and system related data.

The data management device 101*a*-101*n* stores all the data related to the ticketing system. This data is transferred via the respective ticketing device interface to the respective ticketing device 400*a*-400*n*.

Data (gaming data) for the ticketing device 400*a*-400*n* may be generated whenever a player at a gaming machine 100*a*-100*n* decides to cash out the credits of the respective gaming machine 100*a*-100*n*. In this case the player orders a pay out to the gaming machine 100*a*-100*n* by e.g. pressing a cash-out button. Typically the gaming machine generates an instruction which may be communicated via any common used protocol to a controller 103*a*-103*n* of the gaming machine 100*a*-100*n*.

The gaming machine 100*a*-100*n* may be configured in such a way that the gaming machine 100*a*-100*n* does not pay out the credits. As the data management system has to collect all audit data generated by the gaming machine 100*a*-100*n* the data management system also takes up the information about the pay out order of the player by the interconnecting network 208. The data management device within the relevant gaming machine processes and stores the collected gaming data 502.

After processing the gaming data 502 the ticketing device interface TDI of the data management device 101*a*-101*n* transfers a relevant gaming data to the respective ticketing device 400*a*-400*n*. The transferred gaming data 502 generates the instruction to print a ticket 500 which contains the amount of pay out as well as a unique identification code. The player may use this ticket for a payout at the casino cashpoint or may use a ticket to wager the amount of the ticket at the same or any other gaming machine 100*a*-100*n* dealing with the same ticketing system.

Gaming data 502 are processed in a specific data management device 101*a*-101*n*. Furthermore external data from another data management device 101*a*-101*n* can be stored in the memory unit 107*a*-107*n*. Gaming data 502 may be stored n-times in a series of data management devices 101*a*-101*n* within gaming machines 100*a*-100*n* such that a redundancy of storing the relevant gaming data 502 is provided.

The data management device 101 may be adapted to allow the player to make a wager using the ticket 500. The processor unit 106 of the data management system may further be adapted to verify the amount of the ticket in percent the outcome of the game played and a pay out associated with the outcome. The data management device 101 may be further programmed to cause the value-dispensing mechanism to dispense at least one pay out which is determined based on information input by the user at a gaming machine 100. Furthermore the data management device 101 may be programmed to cause the display unit of the gaming machine to generate a graphic and the amount of credits.

Figure 5:
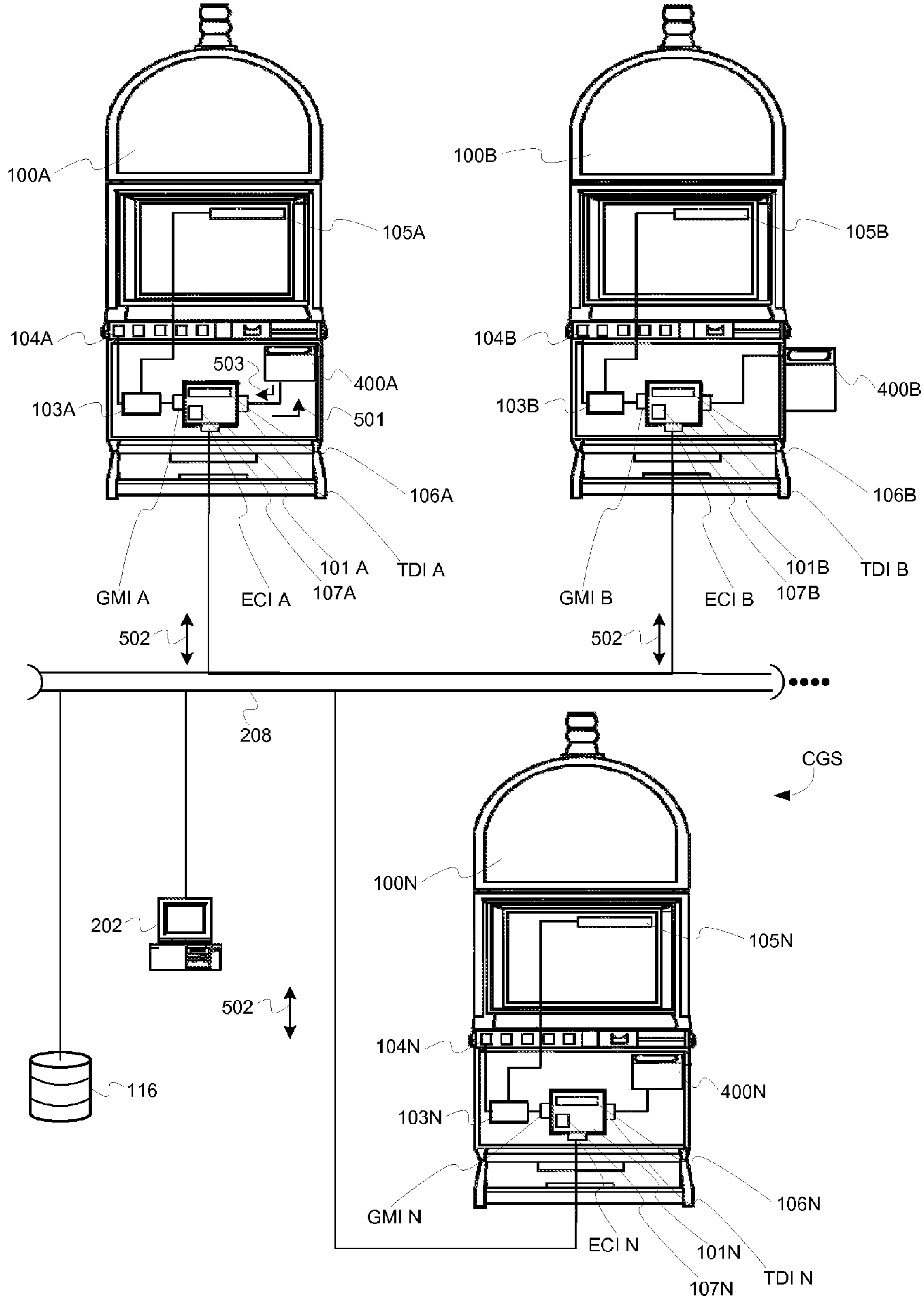
FIG. 5 is a cashless electronic gaming system of FIG. 4 having a central storage for storing gaming data.

FIG. 5 shows the data management system for cashless operation of a system of gaming machines 100*a*-100*n* according to FIG. 4 except that an additional central storage 116 is provided. A cashless gaming system CGS may include a central storage 116 connected to the data bus device 208. The central storage 116 is designed to additionally store gaming data 502, e.g. as a backup means. The ticket management apparatus TMA of a gaming machine 100 provides an exchange of gaming data 502 between external devices 208 and the ticketing device 400 mounted at the gaming machine 100.

The cashless gaming system CGS has a plurality of gaming machines 100*a*-100*n* and a plurality of ticket management apparatus TMA. Each of the ticket management apparatus TMA is associated with a respective gaming machine 100*a*-100*n* and a data bus device 208 to which the external communication interfaces ECIa-ECIn of the plurality of ticket management apparatus TMA are connected for exchanging gaming data.

It is possible to exchange gaming data 502 directly between the external device 208 and the controller 103 of the gaming machine 100. Furthermore it is possible to exchange gaming data 502 between the controller 103 of the electronic gaming machine 100 and the ticketing device 400 using the gaming machine interface GMI and the ticketing device interface TDI. Thus the data management device 101 is a central unit for a gaming data exchange within the electronic gaming device 100 and for a gaming data exchange with external units (external devices, a network, a data bus device) 208.

It is possible that the ticketing device 400 is controlled by the gaming system.

Figure 3:
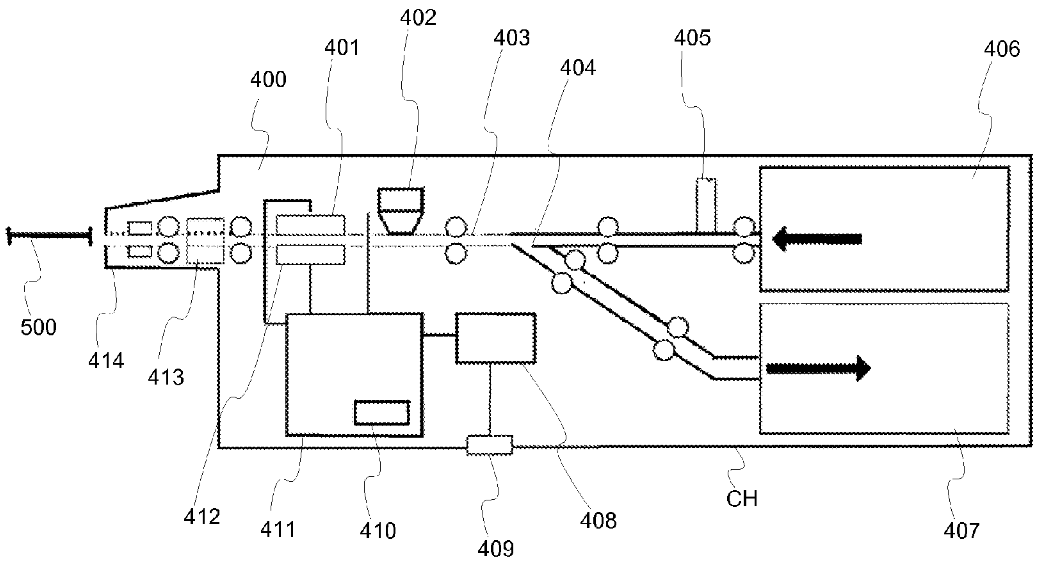
FIG. 3 is a ticketing device mounted on the electronic gaming machine shown in FIG. 2, depicted in more detail.

The ticketing device 400*a*-400*n* shown in FIG. 3 for inputting and outputting tickets 500 containing gaming data 502 according to the present invention includes a reading unit 416 and a writing unit 402. The reading unit is designed for reading as read data 501 gaming data 502 from a ticket 500 which has been inserted. The writing unit 402 is designed for writing as write data 503 gaming data 502 onto a ticket 500 which has been transported from the ticket storage to the writing unit 402.

The reading unit 416 and the writing unit 402 share a common housing CH having a single common slot 414 for inserting and outputting tickets 500 containing the gaming data 502.

With reference to FIG. 3 the ticketing device 400 is described on more detail. The ticketing device 400 consists of several units accommodated in a common housing CH. One aspect of the ticketing device 400 is that a common slot 414 is provided for inserting and dispensing tickets 500. An insertion sensor unit 415 detects the ticket 500 which has been inserted into the common slot 414. A centralizing mechanism 413 is provided to direct the ticket 500 to a subsequent sensor unit 401. A writing unit 402 is provided to write gaming data 502 onto the ticket 500. A ticketing device controller 411 has a ticketing device memory unit 410 and controls the operation of the writing unit 402.

As photographic and printing devices have made it possible to generate counterfeit tickets relatively easy tickets 500 used in a cashless operation of gaming machines 100 have to be protected against unauthorized publication using advanced reprographic technology such as high quality copying machines, desk top publishing and scanners. This counterfeit protection may be achieved without any limitation by using special paper such as water-marked paper, paper having an UV-marking or providing a hologram.

According to the present invention the ticketing device 400 is designed to provide a ticket dispensing unit and a ticket acceptor unit within one common housing 400, CH and with one common opening 414 (slot) for inserting and dispensing tickets. In the preferred embodiment shown in FIG. 3 the ticketing device 400 contains an integrated sensor unit 415 for detecting a ticket 500 which is inserted into the common opening 414. In this case the ticketing device 400 serves as a ticket acceptor. The insertion sensor 415 transmits a signal to the ticketing device controller 411 which intern starts the transportation unit 403.

An anti-pull back mechanism is activated as soon as the transportation 403 starts and prevents the player from “fishing” the ticket 500 which means retracting the ticket 500 once it has passed the insertion sensor 415.

The transportation unit 403 may contain one or more drive shafts and one or more band conveyers. In the preferred embodiment this band conveyers have a cover of rubber to prevent the tickets from slipping and to ensure a proper transportation without jamming or fraying.

The centralizing mechanism 413 at the band may be implemented for adjusting the tickets to achieve an accurate positioning of the tickets at the subsequent sensor unit 401. In the simplest case the centralizing mechanism may consist of a set of guidebars. However, depending on the ticketing system used, this mechanism may be adapted for a specific use.

In the preferred embodiment of the present invention the inserted ticket 500 then passes the sensor unit 401. The sensor unit 401 may be equipped with various sensors including magnetic or optical sensors. The optical sensors may be formed as infrared and green light emitting diodes LED, reflective, transparency sensors or phototransistors, UV sensors or bar code readers. Any combination of the technologies mentioned may be applied, depending on the ticket media used.

After having acquired the information stored on the ticket 500, the sensor unit sends the relevant signals to the ticketing device controller 411. These signals may be sent separately for each sensor or in packets. The processor contained in the controller 411 converts the signals to data which is communicated to the data management device 101 via a ticket device interface 408 containing a serial port 409. The data management system may operate using a centralized database or in a decentralized manner.

The data management system validates the ticket 500. The result of this validation process is communicated back to the ticketing device controller 411. Relevant information is communicated to the gaming machine 100 and to other peripheral devices 208 connected to the gaming machine 100, such as displays or other data management devices 101. Relevant information includes, but is not limited to, an amount, number of credits, a time stamp, player tracking information, bonusing data, voucher details, a unique ticket identification code or a site name.

The ticketing device controller 411 acquires information about the validation of the ticket 500. If the ticket is valid the controller opens the diverter such that the ticket 500 can be transported to the ticket stacker 407. If the ticket 500 is not determined to be valid the controller 411 may be programmed to transport the ticket to the printer head 402, mark it with a sign and transport it to the opening 414. A player (user of the gaming machine 100) may present a ticket marked as invalid to an attendant to have it checked, redeemed or replaced if necessary.

Furthermore all transaction data, i.e. gaming data 502 is stored in a ticketing device memory unit 410 within the ticketing device controller 411 designed to be an on-board memory for independently storing gaming data 502.

When a player decides to cash out a win he or she presses the cash-out button 104 on the gaming machine 100, the data management device 101 receives the cash-out information and sends a signal to the ticketing device controller 411.

Upon receiving the signal for dispensing a ticket 500 the controller 411 of the ticketing device 400 causes the transportation unit 403 to start the band conveyer in the right direction and diverter 404 to close the transportation paths to the ticket stacker 407.

A new ticket is taken from the ticket storage box 406 and cut off from a paper roll at a ticket cutter 405. Preferably the ticket cutter is positioned near the ticket storage box 406. The ticket information is printed by a writing unit designed as a printer 402. The writing unit 402, i.e. the printer 402 may be an ink jet printer, a thermal printer or a printer for magnetic stripes. The transaction information is stored in the ticketing device memory unit 410 within the ticketing device controller 411 of the ticketing device 400.

Furthermore an input device of the ticketing device may be an electronic reader capable of reading an object having user identification information or user preference information stored thereon with the items or combination of items dispensed to the user being determined based on the user preference information stored on the object. Additionally, the tickets 500 can be combinations of token bills having particular monetary values and complementary coupons for game tokens, gifts, . . . etc.

In a preferred embodiment multiple decentralized validation devices within the data management device 101 may accommodate to multiple gaming machines 100 and may store transaction information associated with the gaming machines 100. More specifically, credit device information corresponding to external devices 208 that are waiting for redemption may be stored.

The gaming machine 100 will accept credit devices from other gaming machines 100*a*-100*n* connected to the same casino management network. A decentralized data management device may also contain additional memory for storing redundant credit device information. This may be used as a secondary storage medium for credit device information recovery in the event of power failure or memory loss at the main memory of the network 208. In addition players may redeem credit devices for cash at the decentralized cage or cash dispenser at any time.

A ticket dispensing mechanism may be adapted to further include at least one container such as a cassette for containing the pay out therein, a mechanism for securely storing the ticket and a mechanism for positively dispensing the ticket. The ticket dispenser may alternatively include a plurality of containers, adapted to be installed therein, each containing a different kind of tickets.

The ticket accepting mechanism may be adapted to further include at least one container such as a cassette for containing the accepted bills for securely storing the tickets. The ticketing device 400 is designed such that the common slot 414 is used by a player for dispensing tickets 500 as well as for accepting tickets 500. When accepting a ticket 500, the ticketing device interface TDI transfers a message with all relevant audit data as well as the unique identification of the ticket 500 to the data management device 101.

The ticket 500 is then validated by processing the data by means of the processor unit 106 of the data management device 101 located in the gaming machine 100 where the ticket 500 was accepted. When handling valid the ticket 500 the data is transferred to the gaming machine 502 using any common communication protocol implemented in the gaming machine 100. Gaming data 500 which are being transferred contain detailed information of an amount wagered, which may be coins, credits or currency units, information about time and other system relevant information.

Furthermore the ticketing device 400 may deal with non-payable credit values. To achieve a diversion of credits in payable ones and non-payable ones information has to be added to the unique ticket identification.

LIST OF REFERENCE NUMERALS

100 gaming machine
101 data management device
103 Controller
104 cashout button
105 display unit
106 processor unit
107 memory unit
116 central storage
202 operator terminal
208 external device/network/databus device
400 Ticketing device
401 subsequent sensor unit
402 writing unit
403 transportation unit
404 divertor unit
405 ticket cutter
406 ticket storage box
407 ticket stacker
408 interface
409 serial port
410 ticketing device memory unit
411 ticketing device controller
413 centralising mechanism
414 Common slot
415 insertion sensor unit
416 reading unit
500 ticket
501 read data
502 gaming data
503 write data
800 gaming machine—prior art
801 controller of gaming machine—prior art
802 ticket dispenser—prior art
803 ticket acceptor—prior art
804 cashout button—prior art
805 network—prior art
806 database—prior art
807 server—prior art
CH common housing
ECI external communication interface
GMI gaming machine interface
TDI ticketing device interface
TMA ticket management apparatus

The invention claimed is:

1. A ticket management apparatus for cashless operation of a gaming machine comprising:

a) a ticketing device configured to receive and output tickets containing gaming data; and b) at least one data management device including b1) a gaming machine interface configured for connection to a controller of the gaming machine, the gaming machine interface configured to exchange at least some of the gaming data between the ticket management apparatus and the controller of the gaming machine;

b2) a ticketing device interface connected to the ticketing device, the ticketing device interface configured to exchange at least some of the gaming data with the ticketing device of the ticket management apparatus;

b3) a processor unit configured to process at least some of the gaming data within the ticket management apparatus;

b4) a memory unit configured to store at least some of the gaming data within the ticket management apparatus; and b5) an external communication interface configured to directly exchange at least some of the gaming data between the ticket management apparatus and one or more other ticket management apparatuses residing in other gaming machines, wherein at least some of the gaming data are stored on the one or more other ticket management apparatuses.

2. The ticket management apparatus according to claim 1, wherein the ticketing device comprises:

a) a reading unit configured to read at least some of the gaming data from at least some of the tickets; and b) a writing unit configured to write at least some of the gaming data onto at least some of the tickets.

3. The ticket management apparatus according to claim 2, wherein the reading unit and the writing unit share a common housing having a single common slot configured to receive and output the tickets.

4. The ticket management apparatus according to claim 2, wherein at least some of the gaming data is about money.

5. The ticket management apparatus according to claim 2, wherein the gaming data on at least some of the tickets indicates a monetary value.

6. The ticket management apparatus according to claim 2, wherein said writing unit comprises an encryption unit for encrypting said gaming data before being written onto said ticket.

7. The ticket management apparatus according to claim 2, wherein said reading unit comprises a decryption unit for decrypting said gaming data read from said ticket.

8. The ticket management apparatus according to claim 2, wherein the gaming data comprises one or more selected from the group consisting of audit data, cashout data, jackpot data, cash flow data, number of games data, identification data, position related data, site data, system related data, valuta data, player data, loyalty point data and bonusing system data.

9. The ticket management apparatus according to claim 1, wherein the gaming data comprises one of more selected from the group consisting of time data, position data, ticket identification data, amount of credit data, number of credits data, timestamp data, player's name data, player tracking data, bonusing data, and casino data.

10. The ticket management apparatus according to claim 1, wherein said ticket includes one selected from the group consisting of a paper token, a voucher and a bonus ticket.

11. The ticket management apparatus according to claim 1, wherein a ticket media of said ticket includes one selected from the group consisting of a paper ticket, a chip card, an inductive contact-free card, a non-volatile memory card, a magnetic stripe card and a punch card.

12. The ticket management apparatus according to claim 1, wherein the gaming data comprises one or more selected from the group consisting of static data and dynamic data of gaming machines.

13. The ticket management apparatus according to claim 12, wherein said static data includes one or more selected of the group consisting of position related data, parameters of the gaming machine, denomination data, maximum-bet data, payout percentage data, serial numbers, game identification data, paytable identification data, bill country data, validation data and game number data.

14. The ticket management apparatus according to claim 12, wherein said dynamic data includes one or more selected from the group consisting of site configuration data, jackpot configuration data and audit data.

15. The ticket management apparatus according to claim 1, wherein the gaming machine with which said gaming machine interface exchanges gaming data is selected from the group consisting of a slot machine, any device featuring games, a video Poker, an electronic roulette, an electronic Black Jack, an electronic Bingo, a gaming table, a card playing table, a roulette table, or a dice table.

16. A ticketing management apparatus for use in concert with a gaming machine, the ticketing management apparatus comprising:

a ticketing device for inputting and outputting tickets containing gaming data, the ticketing device including, a reading unit for reading a first portion of the gaming data from a first ticket after insertion of the first ticket into said reading unit; and a writing unit for writing a second portion of the gaming data onto a second ticket which has been transported to the writing unit, and wherein said reading unit and said writing unit share a common housing having a single common slot for inserting and outputting tickets;

a data management device configured to store at least some of the gaming data in the ticketing management apparatus separate from the gaming machine, and to share at least some of the gaming data directly with other ticketing management apparatuses configured for operation with other gaming machines, wherein the at least some of the gaming data are stored by the other ticketing management apparatuses.

17. A ticketing device according to claim 16, wherein said reading unit comprises a bar code reader.

18. A ticketing device according to claim 16, wherein said reading unit comprises a magnetic stripe reader.

19. A ticketing device according to claim 16, wherein said reading unit comprises a sensor unit selected from one or more of the group consisting of a UV-sensor, a phototransistor, an infrared LED, a green LED, a transparency sensor and an inductive sensor.

20. A ticketing device according to claim 16, wherein said writing unit comprises a printer unit.

21. A ticketing device according to claim 16, wherein the ticket is one selected from the group consisting of a bar coded paper token, a magnetic stripe, a voucher, a smart card, a punch card and a chip card.

22. A ticketing device according to claim 16, comprising at least one first container for storing and dispensing ticket payout.

23. A ticketing device according to claim 16, comprising at least one second container for accepting and storing tickets inserted into the single common slot.

24. A ticket management system for cashless operation of gaming machines, the system comprising:

a first gaming machine having a first ticket management apparatus, the first ticket management apparatus including:

a first ticketing device configured to receive and output tickets containing gaming data; and a first data management device including:

a first gaming machine interface configured for connection to a first controller, the first gaming machine interface configured to exchange at least some of the gaming data between the first ticket management apparatus and the first controller;

a first ticketing device interface connected to the first ticketing device, the first ticketing device interface configured to exchange at least some of the gaming data with the first ticketing device;

a first processor unit configured to process at least some of the gaming data with the first ticketing device of the ticket management apparatus;

a first memory unit configured to store at least some of the gaming data within the first management apparatus; and a first external communication interface; and a second gaming machine having a second ticket management apparatus, the second ticket management apparatus including:

a second ticketing device configured to receive and output tickets containing the gaming data; and a second data management device including:

a second gaming machine interface configured for connection to a second controller, the second gaming machine interface configured to exchange at least some of the gaming data between the second ticket management apparatus and the second controller;

a second ticketing device interface connected to the second ticketing device, the second ticketing device interface configured to exchange at least some of the gaming data with the second ticketing device;

a second processor unit configured to process at least some of the gaming data with the second ticketing device of the second ticket management apparatus;

a second memory unit configured to store at least some of the gaming data within the second ticket management apparatus; and a second external communication interface, wherein the second external communication interface and the first external communication interface are configured to exchange the gaming data between the first ticket management apparatus and the second ticket management apparatus, wherein the gaming data is stored in the first memory unit and the second memory unit.

25. The system of claim 24, further comprising an operator terminal configured to control operation of the first and second gaming machines.

26. The system of claim 25, further comprising a central storage configured to backup the gaming data.

* * * * *